(12) United States Patent
Jayaraman et al.

(10) Patent No.: US 11,086,708 B2
(45) Date of Patent: Aug. 10, 2021

(54) AUTOMATED COGNITIVE MULTI-COMPONENT PROBLEM MANAGEMENT

(71) Applicant: International Business Machines Corporation, Armonk, NY (US)

(72) Inventors: Arunachalam Jayaraman, Chennai (IN); Agnello Mervyn Pinto, Bangalore (IN)

(73) Assignee: International Business Machines Corporation, Armonk, NY (US)

( * ) Notice: Subject to any disclaimer, the term of this patent is extended or adjusted under 35 U.S.C. 154(b) by 148 days.

(21) Appl. No.: 15/996,629

(22) Filed: Jun. 4, 2018

(65) Prior Publication Data
US 2019/0370101 A1 Dec. 5, 2019

(51) Int. Cl.
*G06F 11/07* (2006.01)

(52) U.S. Cl.
CPC ........ *G06F 11/079* (2013.01); *G06F 11/0709* (2013.01); *G06F 11/0751* (2013.01); *G06F 11/0787* (2013.01); *G06F 11/0793* (2013.01)

(58) Field of Classification Search
CPC .... G06F 11/079; G06F 11/0793; G06F 11/34; G06F 11/3409; G06F 11/3447; G06F 11/3452; G06F 11/3457
See application file for complete search history.

(56) References Cited

U.S. PATENT DOCUMENTS

| 5,018,075 | A | * | 5/1991 | Ryan | ........................ | G06N 5/04 |
| | | | | | | 706/46 |
| 7,099,879 | B2 | | 8/2006 | Tacaille et al. | | |

(Continued)

FOREIGN PATENT DOCUMENTS

| CN | 102244767 A | 11/2011 |
| CN | 103684916 A | 3/2014 |

(Continued)

OTHER PUBLICATIONS

Stephanie Overby, CIO, "Engineers Could Transform IT Outsourcing", https://www.cio.com/article/2600329/outsourcing/virtual-engineers-could-transform-it-outsourcing.html, Copyright 2018 IDG Communications, Inc., 4 pages.

(Continued)

*Primary Examiner* — Joseph O Schell
(74) *Attorney, Agent, or Firm* — William H. Hartwell; Hunter E. Webb; Keohane & D'Alessandro, PLLC

(57) ABSTRACT

Approaches presented herein enable automated cognitive problem management in a systems environment. A first problem component is identified from a problem ticket. In response to the problem ticket, a logical relationship between the problem component and other related components is generated. While applying an automated fix to the problem component, its related components are measured for any deviation. If a deviation exists, a second problem component is identified and a causality relationship among the first and second components is established. An automated fix is applied to the second problem component and then to the first problem component based on the causality relationship. The causality relationship and order of applying the component fixes is stored for resolving future similar problem tickets.

20 Claims, 8 Drawing Sheets

(56) References Cited

U.S. PATENT DOCUMENTS

| | | | |
|---|---|---|---|
| 7,774,147 B1* | 8/2010 | Manaev | G06F 8/658 |
| | | | 702/35 |
| 8,639,971 B1* | 1/2014 | White | G06F 11/0709 |
| | | | 707/687 |
| 8,645,529 B2 | 2/2014 | Doddavula | |
| 8,812,542 B1* | 8/2014 | Saring | G06F 16/1827 |
| | | | 707/770 |
| 8,930,395 B2 | 1/2015 | Sharma et al. | |
| 9,336,259 B1* | 5/2016 | Kane | G06F 11/0793 |
| 2006/0020866 A1 | 1/2006 | Lo et al. | |
| 2008/0016115 A1* | 1/2008 | Bahl | H04L 41/22 |
| 2008/0201705 A1* | 8/2008 | Wookey | G06F 8/658 |
| | | | 717/175 |
| 2009/0055684 A1* | 2/2009 | Jamjoom | G06F 11/0709 |
| | | | 714/26 |
| 2010/0146325 A1* | 6/2010 | John | G06F 11/0793 |
| | | | 714/3 |
| 2011/0087924 A1* | 4/2011 | Kandula | G06F 11/0709 |
| | | | 714/26 |
| 2011/0138234 A1* | 6/2011 | Biazetti | G06F 11/0709 |
| | | | 714/48 |
| 2011/0145392 A1 | 6/2011 | Dawson et al. | |
| 2011/0246835 A1* | 10/2011 | Hasegawa | G06F 11/0748 |
| | | | 714/39 |
| 2014/0082612 A1 | 3/2014 | Breitgand et al. | |
| 2014/0337431 A1 | 11/2014 | Naseh et al. | |
| 2015/0378710 A1* | 12/2015 | Kabue | G06F 8/70 |
| | | | 717/168 |
| 2017/0004065 A1* | 1/2017 | Angwin | G06F 11/3668 |
| 2017/0235660 A1 | 8/2017 | Chana et al. | |
| 2018/0032941 A1* | 2/2018 | Naous | G06Q 10/06395 |
| 2019/0081861 A1* | 3/2019 | Kaluza | H04L 41/5058 |

FOREIGN PATENT DOCUMENTS

| | | |
|---|---|---|
| WO | 2012047746 A2 | 4/2012 |
| WO | 2014049389 A1 | 4/2014 |

OTHER PUBLICATIONS

Stephanie Overby, CIO, "10 IT Outsourcing Trends to Watch in 2014", https://www.cio.com/article/2378979/outsourcing/10-it-outsourcing-trends-to-watch-in-2014.html, Copyright 2018 IDG Communications, Inc., 5 pages.

IPSoft, IPcenter in Action, www.ipsoft.com, 2017, 14 pgs.

"Automated Monitoring and Event Recovery of Vblock Infrastructure Platforms with Ipsoft Managed Service", May 2011, www.vce.com, 20 pgs.

\* cited by examiner

AUTOMATED COGNITIVE MULTI-COMPONENT PROBLEM MANAGEMENT

TECHNICAL FIELD

The subject matter of this invention relates generally to problem resolution in network and systems management. More specifically, aspects of the present invention provide a solution for automated cognitive problem management in a systems environment.

BACKGROUND

A systems environment may include any number of network devices such as switches, routers, and firewalls that are interconnected for the purpose of data communication among the devices and endstations, such as mainframes, servers, hosts, printers, fax machines, among others. In computer networks and systems, ensuring correct coordination and interaction between different components is a key to maintaining processes running as services and a goal of network and systems management.

Network and systems management services may employ a variety of tools, applications, and devices to assist administrators in monitoring and maintaining networks and systems. Network and systems management can be conceptualized as consisting of five functional areas: configuration management, performance and accountant management, problem management, operations management and change management. Problem management involves five main steps: problem determination, problem diagnosis, problem bypass and recovery, problem resolution, and problem tracking and control. Problem determination consists of detecting a problem and completing other precursory steps to problem diagnosis, such as isolating the problem to a particular subsystem. Problem diagnosis consists of efforts to determine the precise cause of the problem and any actions required to solve it.

SUMMARY

In general, embodiments of the present invention provide for automated cognitive problem management in a systems environment. A first problem component is identified from a problem ticket. In response to the problem ticket, a logical relationship between the problem component and other related components is generated. While applying an automated fix to the problem component, its related components are measured for any deviation. If a deviation exists, a second problem component is identified, and a causality relationship among the first and second components is established. An automated fix is applied to the second problem component and then to the first problem component based on the causality relationship. The causality relationship and order of applying the component fixes is stored for resolving future similar problem tickets.

One aspect of the present invention includes a method for automatically processing a problem ticket in a systems environment, the method comprising: identifying a first problem component corresponding to the problem ticket; generating a logical relationship between the first problem component and a set of related components; dynamically detecting, in response to attempting to apply a first automated fix to the first problem component, a deviation which identifies a second problem component among the set of related components; defining a causality relationship between the first and second problem components; and defining, based on the causality relationship, an automated fix sequence.

Another aspect of the present invention includes a computer program product embodied in a computer readable medium that, when executed by a computer device, performs a method for automatically processing a problem ticket in a systems environment, the method comprising: identifying a first problem component corresponding to the problem ticket; generating a logical relationship between the first problem component and a set of related components; dynamically detecting, in response to attempting to apply a first automated fix to the first problem component, a deviation which identifies a second problem component among the set of related components; defining a causality relationship between the first and second problem components; and defining, based on the causality relationship, an automated fix sequence.

Yet another aspect of the present invention includes a system for automatically processing a problem ticket in a systems environment, comprising: a memory medium comprising instructions; a bus coupled to the memory medium; and a processor coupled to the bus that when executing the instructions causes the system to perform a method, comprising: identifying a first problem component corresponding to the problem ticket; generating a logical relationship between the first problem component and a set of related components; dynamically detecting, in response to attempting to apply a first automated fix to the first problem component, a deviation which identifies a second problem component among the set of related components; defining a causality relationship between the first and second problem components; and defining, based on the causality relationship, an automated fix sequence.

BRIEF DESCRIPTION OF THE SEVERAL VIEWS OF THE DRAWINGS

These and other features of this invention will be more readily understood from the following detailed description of the various aspects of the invention taken in conjunction with the accompanying drawings in which.

Figure 1:
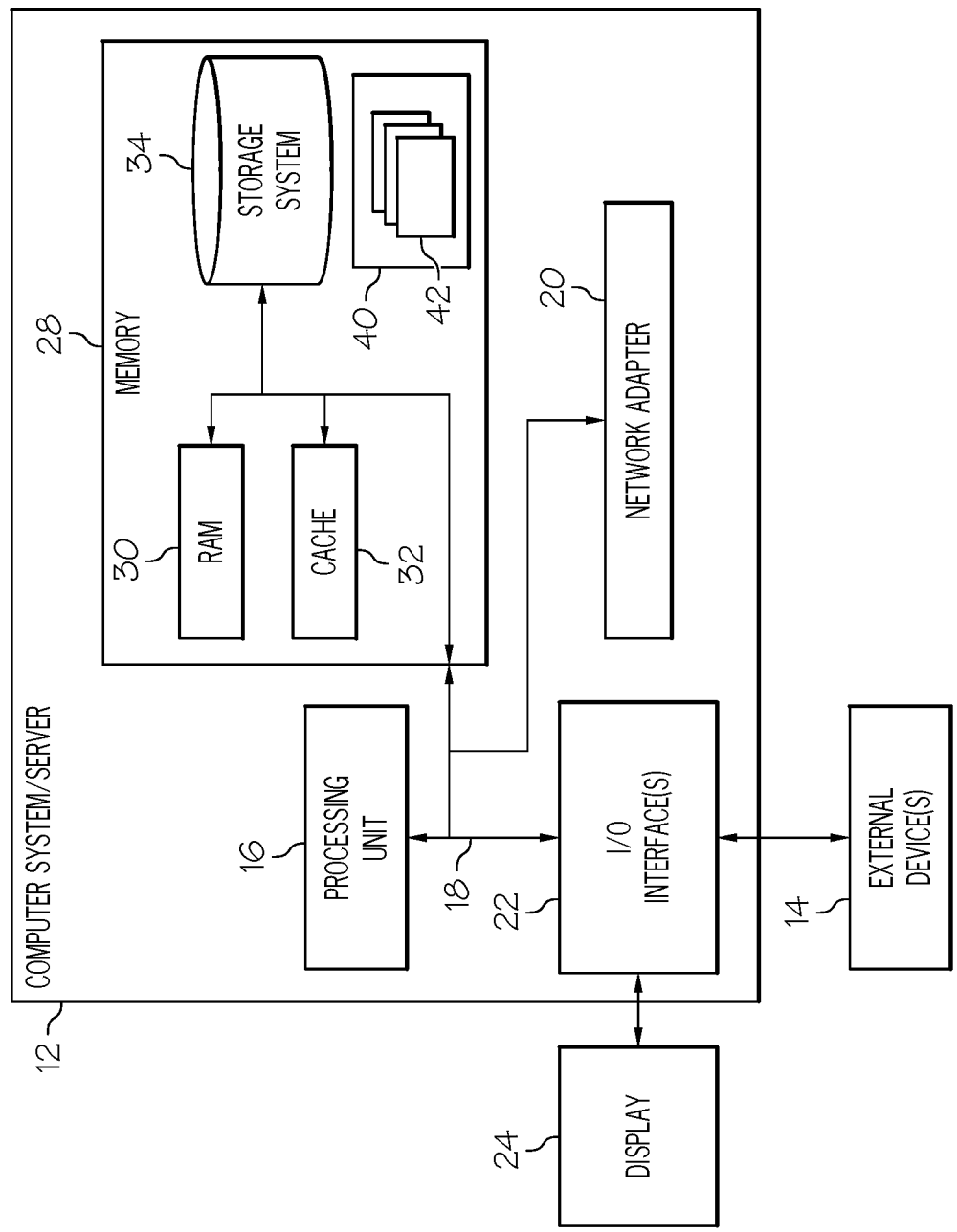
FIG. 1 shows an architecture 10 in which the invention may be implemented according to an illustrative embodiment of the present invention.

The drawings are not necessarily to scale. The drawings are merely representations, not intended to portray specific parameters of the invention. The drawings are intended to depict only typical embodiments of the invention, and therefore should not be considered as limiting in scope. In the drawings, like numbering represents like elements.

DETAILED DESCRIPTION

Illustrative embodiments will now be described more fully herein with reference to the accompanying drawings, in which illustrative embodiments are shown. It will be appreciated that this disclosure may be embodied in many different forms and should not be construed as limited to the illustrative embodiments set forth herein. Rather, these embodiments are provided so that this disclosure will be thorough and complete and will fully convey the scope of this disclosure to those skilled in the art.

Furthermore, the terminology used herein is for the purpose of describing particular embodiments only and is not intended to be limiting of this disclosure. As used herein, the singular forms "a", "an", and "the" are intended to include the plural forms as well, unless the context clearly indicates otherwise. Furthermore, the use of the terms "a", "an", etc., do not denote a limitation of quantity, but rather denote the presence of at least one of the referenced items. Furthermore, similar elements in different figures may be assigned similar element numbers. It will be further understood that the terms "comprises" and/or "comprising", or "includes" and/or "including", when used in this specification, specify the presence of stated features, regions, integers, steps, operations, elements, and/or components, but do not preclude the presence or addition of one or more other features, regions, integers, steps, operations, elements, components, and/or groups thereof.

Unless specifically stated otherwise, it may be appreciated that terms such as "processing", "detecting", "determining", "evaluating", "receiving", or the like, refer to the action and/or processes of a computer or computing system, or similar electronic data center device, that manipulates and/or transforms data represented as physical quantities (e.g., electronic) within the computing system's registers and/or memories into other data similarly represented as physical quantities within the computing system's memories, registers or other such information storage, transmission, or viewing devices. The embodiments are not limited in this context.

As stated above, embodiments of the present invention provide for automated cognitive problem management in a systems environment. A first problem component is identified from a problem ticket. In response to the problem ticket, a logical relationship between the problem component and other related components is generated. While applying an automated fix to the problem component, its related components are measured for any deviation. If a deviation exists, a second problem component is identified and a causality relationship among the first and second components is established. An automated fix is applied to the second problem component and then to the first problem component based on the causality relationship. The causality relationship and order of applying the component fixes is stored for resolving future similar problem tickets.

Referring now to FIG. 1, a computerized implementation 10 of an embodiment for automated cognitive problem management in a systems environment will be shown and described. Computerized implementation 10 is only one example of a suitable implementation and is not intended to suggest any limitation as to the scope of use or functionality of embodiments of the invention described herein. Regardless, computerized implementation 10 is capable of being implemented and/or performing any of the functionality set forth hereinabove.

In computerized implementation 10, there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

This is intended to demonstrate, among other things, that the present invention could be implemented within a network environment (e.g., the Internet, a wide area network (WAN), a local area network (LAN), a virtual private network (VPN), etc.), a cloud computing environment, a cellular network, or on a stand-alone computer system. Communication throughout the network can occur via any combination of various types of communication links. For example, the communication links can comprise addressable connections that may utilize any combination of wired and/or wireless transmission methods. Where communications occur via the Internet, connectivity could be provided by conventional TCP/IP sockets-based protocol, and an Internet service provider could be used to establish connectivity to the Internet. Still yet, computer system/server 12 is intended to demonstrate that some or all of the components of implementation 10 could be deployed, managed, serviced, etc., by a service provider who offers to implement, deploy, and/or perform the functions of the present invention for others.

Computer system/server 12 is intended to represent any type of computer system that may be implemented in deploying/realizing the teachings recited herein. Computer system/server 12 may be described in the general context of computer system executable instructions, such as program modules, being executed by a computer system. Generally, program modules may include routines, programs, objects, components, logic, data structures, and so on, that perform particular tasks or implement particular abstract data types. In this particular example, computer system/server 12 represents an illustrative system for automated cognitive problem management in a systems environment. It should be understood that any other computers implemented under the present invention may have different components/software, but can perform similar functions.

Computer system/server 12 in computerized implementation 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Processing unit 16 refers, generally, to any apparatus that performs logic operations, computational tasks, control functions, etc. A processor may include one or more subsystems, components, and/or other processors. A processor will typically include various logic components that operate using a clock signal to latch data, advance logic states, synchronize computations and logic operations, and/or provide other timing functions. During operation, processing unit 16 collects and routes signals representing inputs and outputs between external devices 14 and input devices (not shown). The signals can be transmitted over a LAN and/or a WAN (e.g., T1, T3, 56 kb, X.25), broadband connections (ISDN, Frame Relay, ATM), wireless links (802.11, Bluetooth, etc.), and so on. In some embodiments, the signals may be encrypted using, for example, trusted key-pair encryption. Different systems may transmit information using different communication pathways, such as Ethernet or wireless networks, direct serial or parallel connections, USB, Firewire®, Bluetooth®, or other proprietary interfaces. (Firewire is a registered trademark of Apple Computer, Inc. Bluetooth is a registered trademark of Bluetooth Special Interest Group (SIG)).

In general, processing unit 16 executes computer program code, such as program code for automated cognitive problem management in a systems environment, which is stored in memory 28, storage system 34, and/or program/utility 40. While executing computer program code, processing unit 16 can read and/or write data to/from memory 28, storage system 34, and program/utility 40.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media, (e.g., VCRs, DVRs, RAID arrays, USB hard drives, optical disk recorders, flash storage devices, and/or any other data processing and storage elements for storing and/or processing data). By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM, or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program code embodied on a computer readable medium may be transmitted using any appropriate medium including, but not limited to, wireless, wireline, optical fiber cable, radio-frequency (RF), etc., or any suitable combination of the foregoing.

Program/utility 40, having a set (at least one) of program modules 42, may be stored in memory 28 by way of example, and not limitation. Memory 28 may also have an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a consumer to interact with computer system/server 12; and/or any devices (e.g., network card, modem, etc.) that enable computer system/server 12 to communicate with one or more other computing devices. Such communication can occur via I/O interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples include, but are not limited to: microcode, device drivers, redundant processing units, external disk drive arrays, RAID systems, tape drives, and data archival storage systems, etc.

Figure 2:
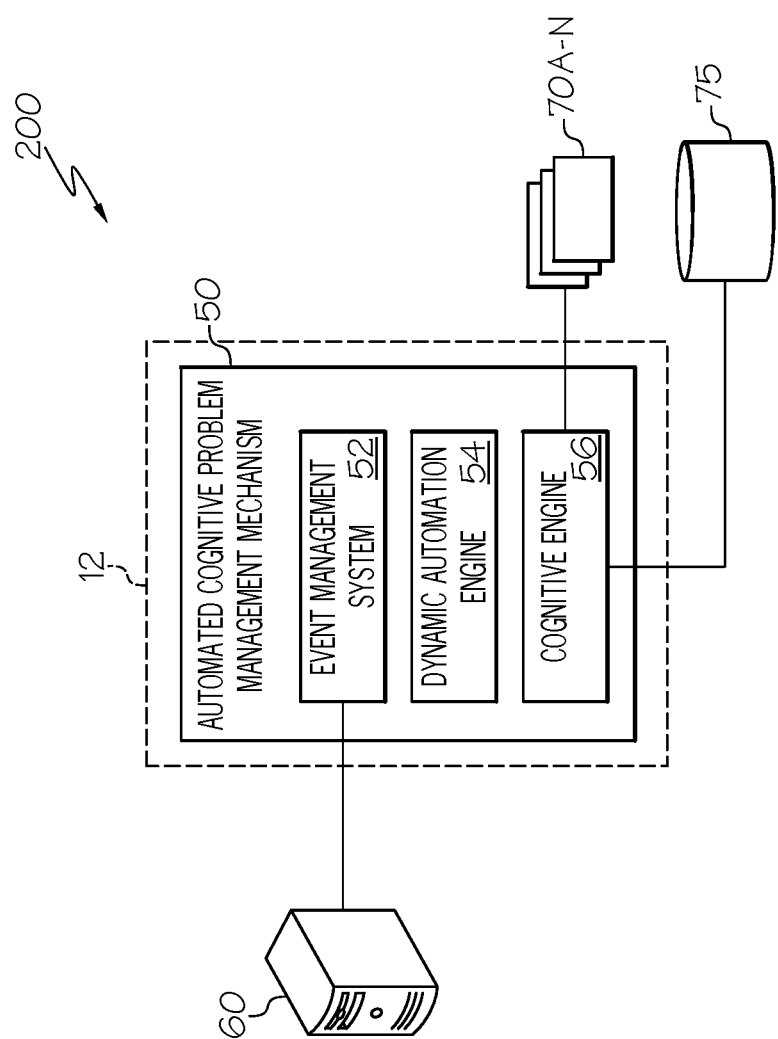
FIG. 2 shows a first schematic diagram 200 illustrating an exemplary environment for implementation according to an illustrative embodiment of the present invention.

Referring now to FIG. 2, a block diagram 200 describing the functionality discussed herein according to an embodiment of the present invention is shown. It is understood that the teachings recited herein may be practiced within any type of computing environment (e.g., computer system 12). To this extent, the teachings recited herein may be practiced within a stand-alone computer system or within a networked computing environment (e.g., a client-server environment, peer-to-peer environment, distributed computing environment, cloud computing environment, and/or the like). If the teachings recited herein are practiced within a networked computing environment, each physical server need not have an automated cognitive problem management mechanism 50 (hereinafter "system 50"). Rather, system 50 could be loaded on a server or server-capable device that communicates (e.g., wirelessly) with the physical server for automated cognitive problem management in a systems environment. In a typical embodiment. However, system 50 or components of system 50 may reside within a screen connected to an electronic device capable of performing the functions described herein.

Regardless, as depicted, system 50 can be implemented as program/utility 40 on computer system 12 of FIG. 1 and can enable the functions recited herein. It is further understood that system 50 can be incorporated within or work in conjunction with any type of system that receives, processes, and/or executes commands with respect to IT resources in a networked computing environment. Such other system(s) have not been shown in FIG. 2 for brevity purposes. As shown, automated cognitive problem management mechanism 50 includes event management system 52, dynamic automation engine 54, and cognitive engine 56. Cognitive engine 56 is configured to read and/or write data from data sources 70A-N and/or knowledge base 75. Data sources 70A-N may include multiple data sources, such as web servers, databases, file systems, and other data sources. The functions/acts of each component is described in detail below.

Event management system 52, as executed by computer system/server 12, is configured to generate a problem ticket related to a system issue when warranted. Computer systems often experience problems such as overflow of buffers, exhaustion of storage allocated to an application, hard drive failures, power outages, software errors, and resource constraints. When such a problem occurs or when a system condition exceeds a threshold suggesting an impending problem, event management system 52 can detect the "event" and generate a problem ticket. A problem ticket can be automatically or manually generated (e.g., by an operator or administrator). The problem ticket may include the following information: problem type, source of problem (i.e., identity of hardware or software component), operating system, network, application, and/or the like.

Figure 3:
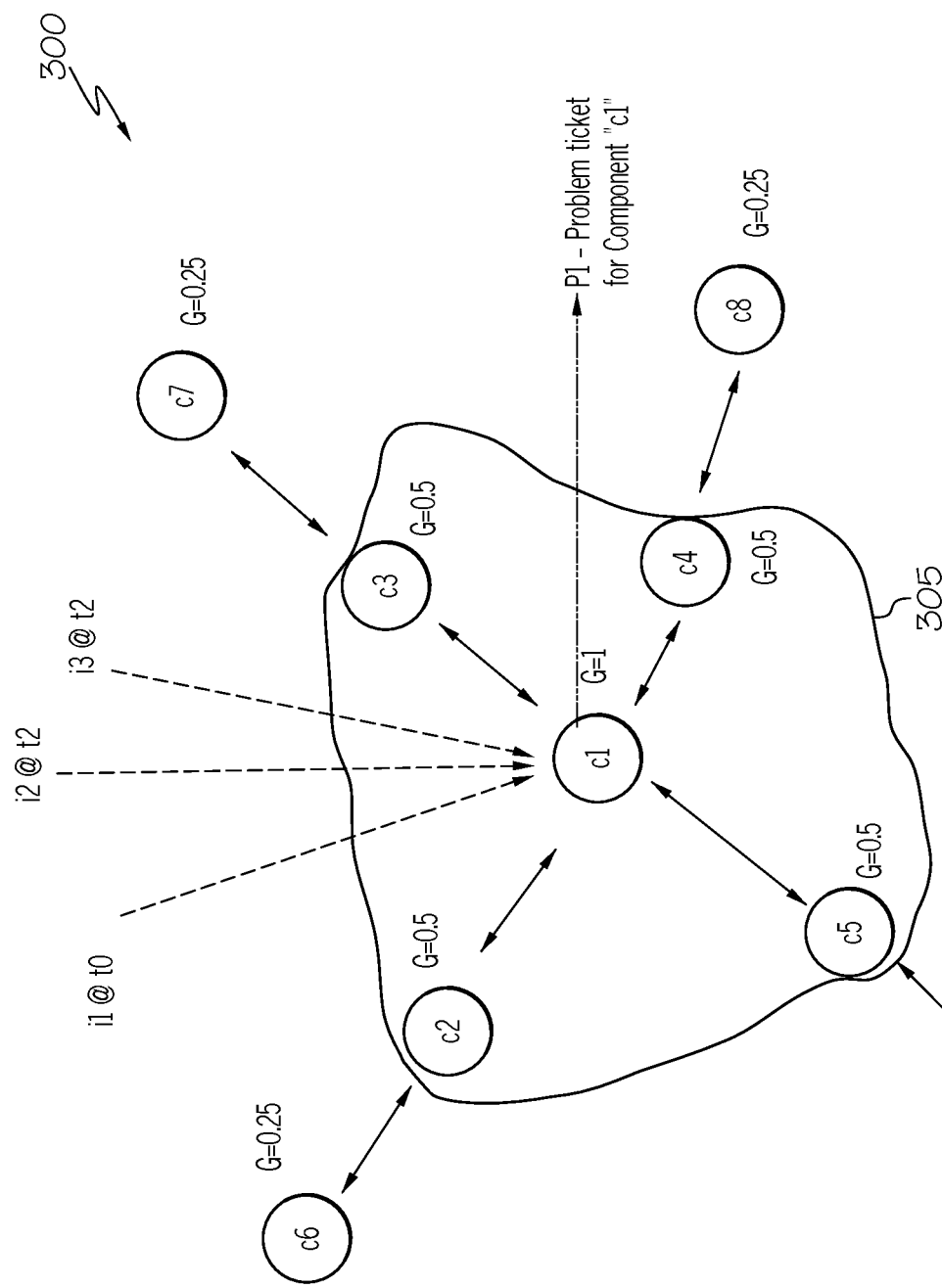
FIG. 3 shows an example components map 300 including a system component related to a problem ticket according to an illustrative embodiment of the present invention.

Dynamic automation engine 54, as executed by computer system/server 12, is configured to generate, in response to a problem ticket, a logical relationship among components in the systems environment. In an embodiment, the logical relationship can be expressed as a components map. FIG. 3 shows an example components map 300 including a system component related to a problem ticket. Assume repeated incidents (i.e., incidents i1, i2, and i3) occur for component c1 within a predefined time interval which initiates problem ticket p1. Keeping the component c1 as a center of the problem, components map 300 is created including all components related to component c1. Dynamic automation engine 54 is further configured to assign a weighted value to each component, based on its relationship to a problem component, in components map 300. For example, component c1 is assigned a weighted value of 1 (i.e., G=1.0) and all immediately related components (i.e., components c2, c3, c4, and c5) are assigned a weighted value of 0.5 (G=0.5). All other secondary related components (i.e., components c6, c7, c8, and c9) are assigned a weighted value of 0.25 (G=0.25).

Dynamic automation engine 54 is further configured to generate a causality sub map that provides focus on components having a weighted value greater than or equal to a predefined threshold value. For example, causality sub map 305 is created which includes only components having a weighted value greater than or equal to 0.5. In this example, causality sub map 305 includes component c1 having the issue and its immediately related components (i.e., components c2, c3, c4, and c5) narrowing the focus on those components that might have a direct effect on component c1.

Cognitive engine 56, as executed by computer system/server 12, is configured to dynamically identify secondary related components based on data sources 70A-N such as subject matter expert (SME) inputs, system and/or component manuals, incident log files, system dumps, and/or the like. In an embodiment, cognitive engine 56 can include IBM's Watson Analytics or Watson Personality Insights (Watson and IBM are trademarks of International Business Machines Corporation). In any case, cognitive engine 56 may generate components map 300 and assign weighted component values dynamically when an incident occurs and is qualified as a problem ticket. For example, consider component c1 is a file system. Component c1 is immediately related to the following components: c2 is a mount point, c3 is a logical volume, c4 is a mount point permission, and c5 is a set of inodes/directories. Second immediately related components include: c6 is a set of physical disks, c7 is a set of physical disk controllers, c8 is a set of physical extends, and c9 is a set of physical connectors. Each component is represented in components map 300.

Figure 4:
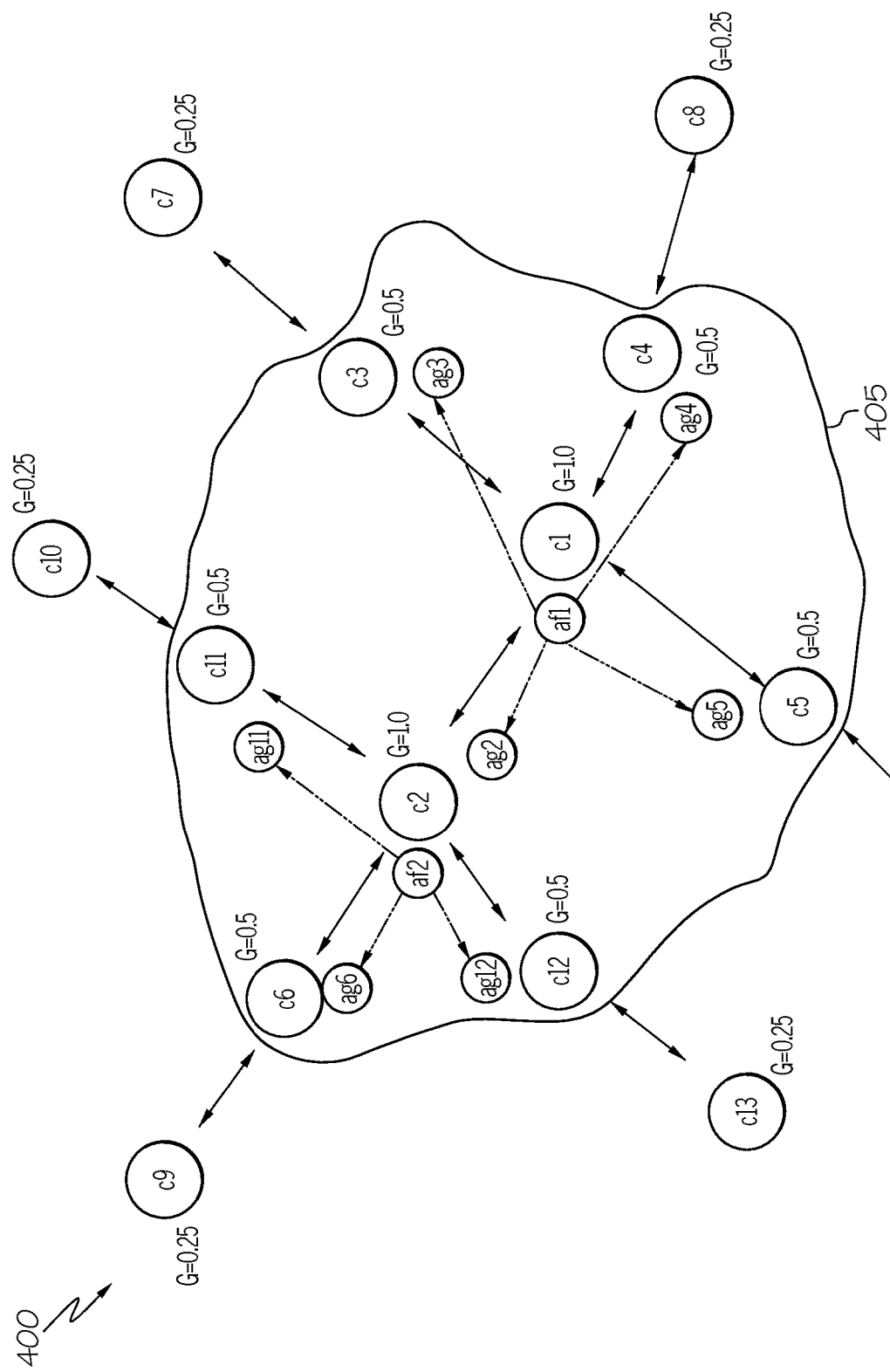
FIG. 4 shows an example components map 400 including causality sub map 405 according to an illustrative embodiment of the present invention.

FIG. 4 shows an example components map 400 including causality sub map 405. As shown, casuality sub map 405 includes components having a weighted value greater than/equal to 0.5. Further, causality sub map 405 includes a predefined automated component fix for components c1 and c2 (i.e., af1 and af2, respectively). Each component in components map 400 may be associated with a predefined automated fix for resolving a particular issue. For example, component c1 (i.e., the file system) may have predefined automated fix af1 which can be triggered for resolving problem ticket p1. While automated fix af1 is being applied to component c1, each immediately related component (i.e., components c2, c3, c4, and c5) is measured for any deviation from a reference and/or predefined status.

For example, component c2 (i.e., the mount point) may be checked to ensure it actually exists. Component c3 (i.e., the logical volume) may be checked to ensure it exists and is accessible. Component c4 (i.e., the mount point permission) may be checked to determine whether the mount point has sufficient permission to get mounted. Component c5 (i.e., the inodes/directories) may be checked to determine whether the inodes are free and/or whether the directory is currently busy being used by another process. The reference/predefined statuses described above are exemplary only and not intended to be limiting. Other statuses and/or values may be evaluated to determine whether a deviation exists related to a particular component.

In an embodiment, these relational checks may be performed by triggering one or more predefined automated monitoring processes (e.g., am1, am2, etc.). In the above example, consider automated monitoring process am2 determined that component c2 also has an issue as the mount point doesn't really exist. In that case, its weighted value is upgraded to G=1.0, Now, two components have a weighted value G=1.0. Therefore, causality sub map 405 is expanded to include related components c6 through c13. Now, automated fix process af2 is performed to fix the issue in component c2. While fixing, all related components are measured as was done while performing automated fix process af1 for component c1. If no additional issues are found (i.e., no further symptom propagation), then causality sub map 405 remains static. In another embodiment, any relational checks may be performed using an existing monitoring solution already configured, such as Information Technology Asset Management (iTAM) software (a trademark of Ivanti), Tivoli Netcool software (a trademark of International Business Machines Corporation), Hewlet Packard Business Technology Optimization (HP BTO) software (a trademark of Hewlet Packard Corporation), and/or the like.

Figure 5:
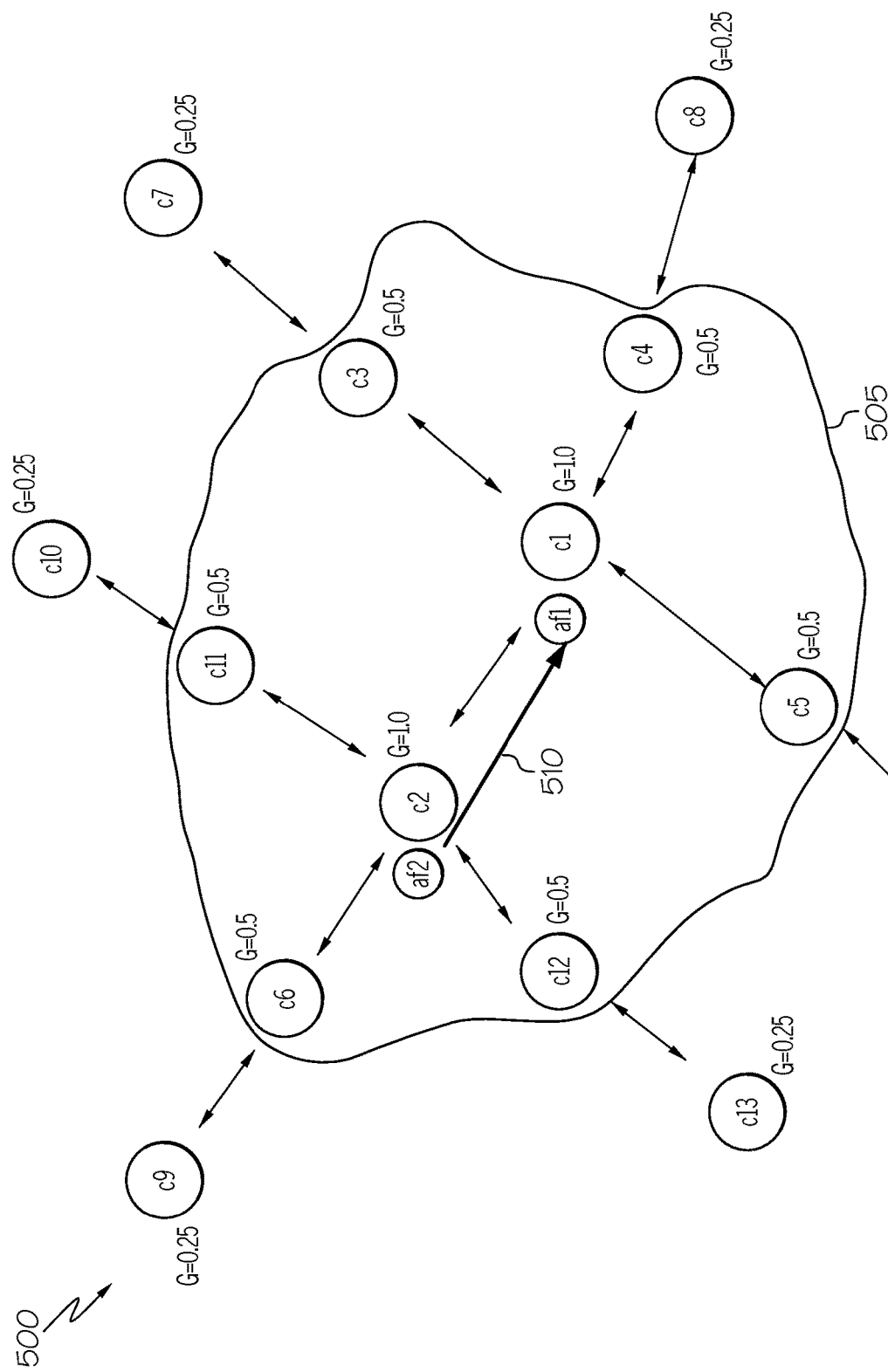
FIG. 5 shows an example causality map 500 including cognitive learning for applying an automated fix sequence 510 according to an illustrative embodiment of the present invention.

FIG. 5 shows an example causality map 500 including cognitive learning for applying an automated fix sequence. Components of causality map 500 having a weighted value greater than/equal to 0.5 are shown. Now, consider the relational wave doesn't propagate further, meaning no additional component fixes are necessary. In another example, it can propagate but still may come to a stable static state. But if the relational wave is ever growing, it can make the system unstable. Therefore, the process may conclude when a predefined threshold (e.g., three components having a causality value of 1.0) is reached. The threshold may be configurable by a user. It can be assumed that a reason for component c1 having an issue is related to component c2. Based on the derived components relationship, an automated fix sequence can be created. Automated fix sequence 510 includes applying automated fix af2 to component c2 prior to applying automated fix af1 to component c1 when confronted with an issue having the details (e.g., problem type, identity of hardware or software component, operating system, etc.) associated with problem ticket p1.

Figure 6:
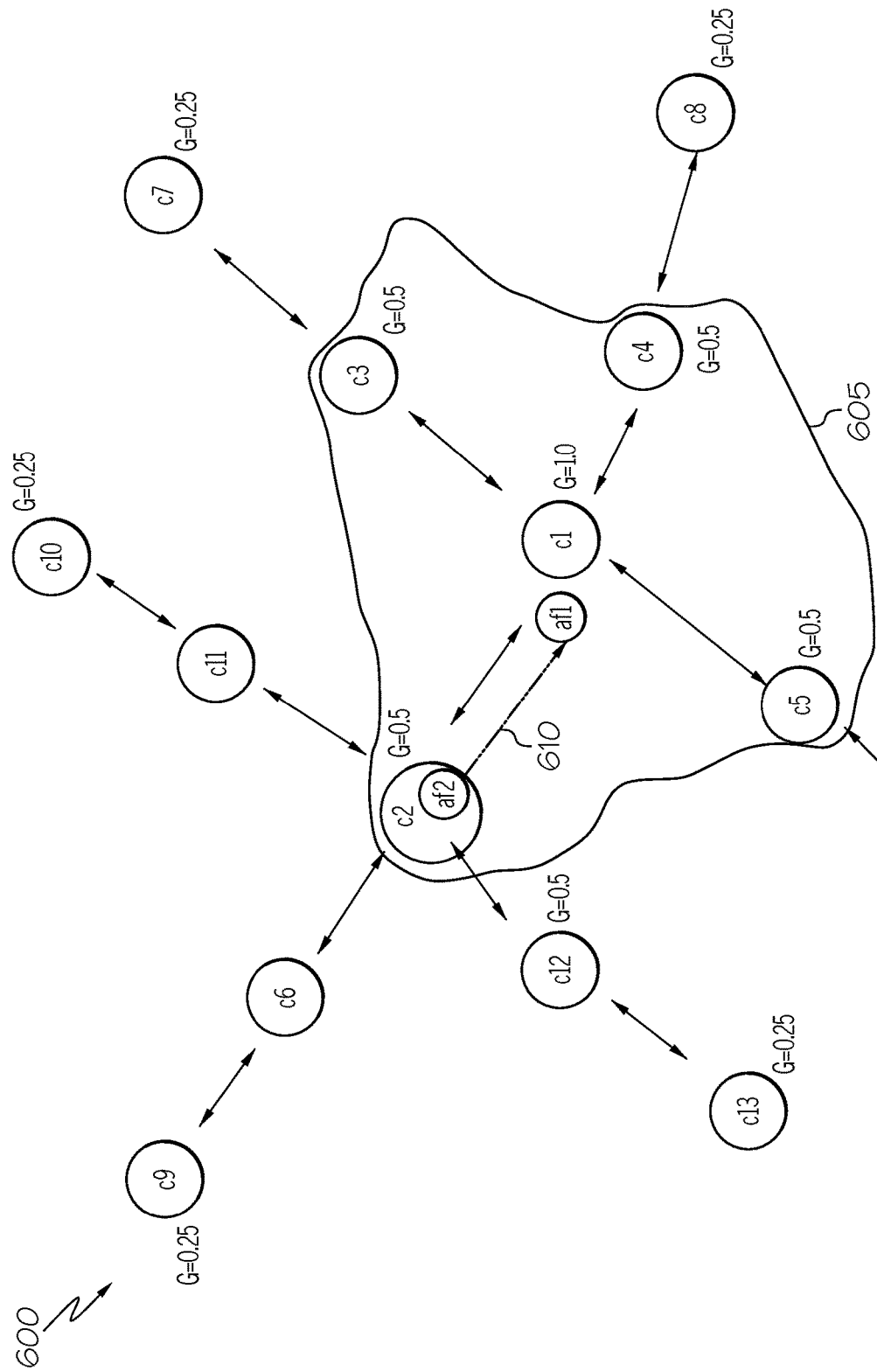
FIG. 6 shows an example components map 600 for utilizing a learned automated fix sequence to shrink causality sub map 605 according to an illustrative embodiment of the present invention.

FIG. 6 shows an example components map 600 for utilizing a learned automated fix sequence to shrink causality sub map 605. A shown, components of components map 600 having a weighted value greater than/equal to 0.5 are shown within causality sub map 605. Automated fix sequence 610 has been derived based on the component fix relationship for problem ticket p1. The component relationship informs that component c1 depends on component c2 and that only these two components in components map 600 are involved in resolving problem ticket p1. Therefore, causality sub map 605 can be updated to include only component c1 and its related components since no symptoms were detected related to component c2.

Figure 7:
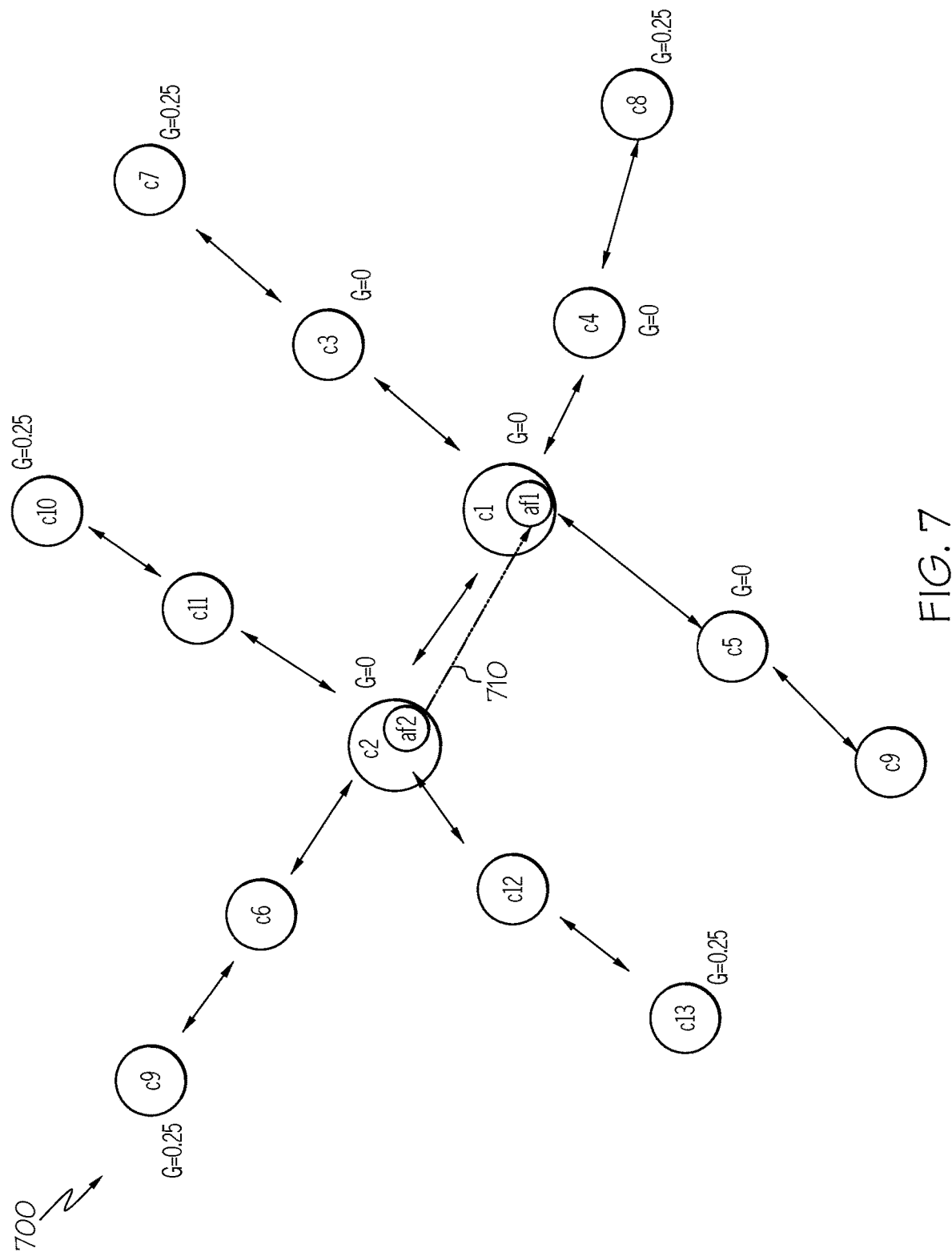
FIG. 7 shows an example components map 700 for applying a learned automated fix sequence to elimiate causality sub map 705 according to an illustrative embodiment of the present invention.

FIG. 7 shows an example causality map 700 for applying a learned automated fix sequence to eliminate the causality map. As discussed, to resolve problem ticket p1, automated fix af2 is applied to component c2 prior to applying automated fix af1 to component c1 (i.e., automated fix sequence 710). After the two automated fixes are applied, the issue is resolved and the weighted values for each component is reset to zero, thereby eliminating the associated casualty sub map.

Cognitive engine 56 is further configured to perform cognitive inference and learning operations. Information related to automated fixes and/or automated fix sequences may be stored in a knowledge base 75. Knowledge base 75 can include a centralized repository of organized knowledge consisting of concepts, data, objectives, requirements, rules, specifications, and/or the like. Cognitive engine 56 is configured to apply logical rules to knowledge base 75 to deduce new information, such as how to resolve a new problem ticket that has been issued. Cognitive engine 56 may deduce an automated fix to perform by comparing information in knowledge base 75 against information in a pending problem ticket (e.g., component having issue, type of issue, etc.). For example, when the issue described in problem ticket p1 occurs in the future, cognitive engine 56 can recognize the issue and automatically and intelligently apply automated fixes af1 and af2 to provide resolution.

Figure 8:
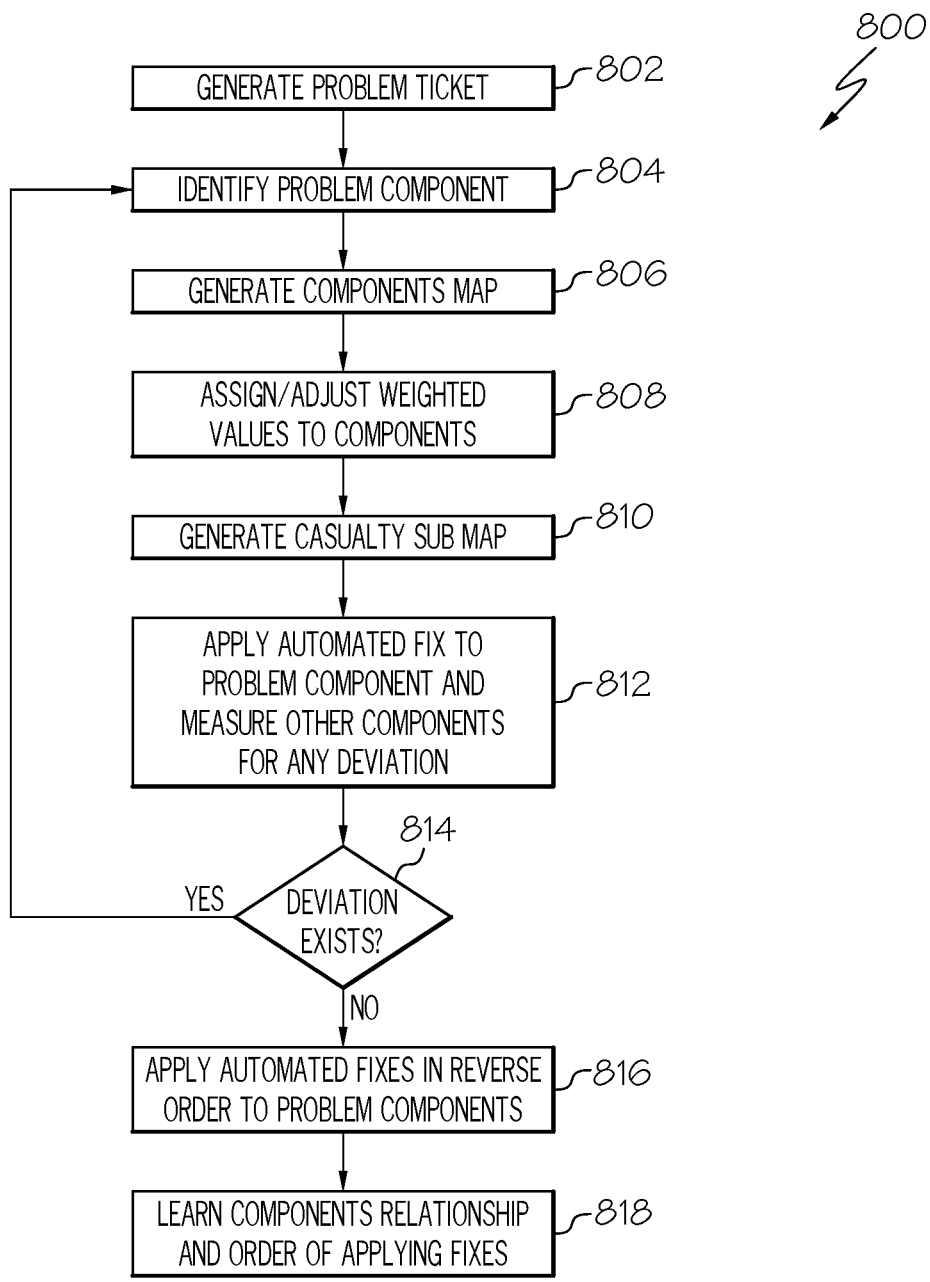
FIG. 8 shows an example flow diagram 800 for automated cognitive problem management in a systems environment according to an illustrative embodiment of the present invention.

Referring now to FIG. 8, in conjunction with FIG. 2, an implementation of a process flowchart 800 for automated cognitive problem management in a systems environment is shown. At 802, event management system 52 detects an event (or system issue) and generates a problem ticket. At 804, a problem component is identified from the problem ticket. At 806, dynamic automation engine 54 generates a system components map in response to the problem ticket. At 808, dynamic automation engine 54 assigns a weighted value to each component of the components map based on its respective relationship to the problem component. At 810, dynamic automation engine 54 generates a casualty sub map based on the assigned weighted values. At 812, while applying an automated fix to the problem component, dynamic automation engine 54 measures the related components of the problem component for any deviation, at 814. If a deviation is found, the component having the deviation is identified and the process returns to step 804. If no deviation is found, an automated fix is applied to each component that has been identified as having a problem, at 816. At 818, cognitive engine 56 learns the relationship between the problem components and the order of applying fixes and stores this information in a knowledge base, so that future similar problem tickets can be automatically and intelligently resolved.

Process flowchart 800 of FIG. 8 illustrates the architecture, functionality, and operation of possible implementations of systems, methods, and computer program products according to various embodiments of the present invention. In this regard, each block in the flowchart may represent a module, segment, or portion of code, which comprises one or more executable instructions for implementing the specified logical function(s). It should also be noted that, in some alternative implementations, the functions noted in the blocks might occur out of the order depicted in the Figures. For example, two blocks shown in succession may, in fact, be executed substantially concurrently. It will also be noted that each block of flowchart illustration can be implemented by special purpose hardware-based systems that perform the specified functions or acts, or combinations of special purpose hardware and computer instructions.

Some of the functional components described in this specification have been labeled as systems or units in order to more particularly emphasize their implementation independence. For example, a system or unit may be implemented as a hardware circuit comprising custom VLSI circuits or gate arrays, off-the-shelf semiconductors such as logic chips, transistors, or other discrete components. A system or unit may also be implemented in programmable hardware devices such as field programmable gate arrays, programmable array logic, programmable logic devices, or the like. A system or unit may also be implemented in software for execution by various types of processors. A system or unit or component of executable code may, for instance, comprise one or more physical or logical blocks of computer instructions, which may, for instance, be organized as an object, procedure, or function. Nevertheless, the executables of an identified system or unit need not be physically located together, but may comprise disparate instructions stored in different locations which, when joined logically together, comprise the system or unit and achieve the stated purpose for the system or unit.

Further, a system or unit of executable code could be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices and disparate memory devices.

Furthermore, systems/units may also be implemented as a combination of software and one or more hardware devices. For instance, program/utility 40 may be embodied in the combination of a software executable code stored on a memory medium (e.g., memory storage device). In a further example, a system or unit may be the combination of a processor that operates on a set of operational data.

As noted above, some of the embodiments may be embodied in hardware. The hardware may be referenced as a hardware element. In general, a hardware element may refer to any hardware structures arranged to perform certain operations. In one embodiment, for example, the hardware elements may include any analog or digital electrical or electronic elements fabricated on a substrate. The fabrication may be performed using silicon-based integrated circuit (IC) techniques, such as complementary metal oxide semiconductor (CMOS), bipolar, and bipolar CMOS (BiCMOS) techniques, for example. Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor devices, chips, microchips, chip sets, and so forth. However, the embodiments are not limited in this context.

Any of the components provided herein can be deployed, managed, serviced, etc., by a service provider that offers to deploy or integrate computing infrastructure with respect to a process for automated cognitive problem management in a systems environment. Thus, embodiments herein disclose a process for supporting computer infrastructure, comprising integrating, hosting, maintaining, and deploying computer-readable code into a computing system (e.g., computer system/server 12), wherein the code in combination with the computing system is capable of performing the functions described herein.

In another embodiment, the invention provides a method that performs the process steps of the invention on a subscription, advertising, and/or fee basis. That is, a service provider, such as a Solution Integrator, can offer to create, maintain, support, etc., a process for automated cognitive problem management in a systems environment. In this case, the service provider can create, maintain, support, etc., a computer infrastructure that performs the process steps of the invention for one or more consumers. In return, the service provider can receive payment from the consumer(s) under a subscription and/or fee agreement, and/or the service provider can receive payment from the sale of advertising content to one or more third parties.

Also noted above, some embodiments may be embodied in software. The software may be referenced as a software element. In general, a software element may refer to any software structures arranged to perform certain operations. In one embodiment, for example, the software elements may include program instructions and/or data adapted for execution by a hardware element, such as a processor. Program instructions may include an organized list of commands comprising words, values, or symbols arranged in a predetermined syntax that, when executed, may cause a processor to perform a corresponding set of operations.

The present invention may also be a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network (for example, the Internet, a local area network, a wide area network and/or a wireless network). The network may comprise copper transmission cables, optical transmission fibers, wireless transmission, routers, firewalls, switches, gateway computers and/or edge servers. A network adapter card or network interface in each computing/processing device receives computer readable program instructions from the network and routes the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an document of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus, or other device to produce a computer implemented process, such that the instructions which execute on the computer, other programmable apparatus, or other device implement the functions/acts specified in the flowchart and/or block diagram block or blocks.

It is apparent that there has been provided herein approaches for automated cognitive problem management in a systems environment. While the invention has been particularly shown and described in conjunction with exemplary embodiments, it will be appreciated that variations and modifications will occur to those skilled in the art. Therefore, it is to be understood that the appended claims are intended to cover all such modifications and changes that fall within the true spirit of the invention.

What is claimed is:

1. A method for automatically processing a problem ticket in a systems environment, the method comprising:
    identifying a first problem component in the systems environment that corresponds to the problem ticket, the problem ticket being related to a problem management issue encountered during operation of the systems environment;
    generating a logical relationship between the first problem component and a set of related components in the systems environment, the set of related components including at least one component for which a problem has not currently been detected;
    monitoring the set of related components, excluding components that do not meet a threshold degree of relatedness, while attempting to apply a first automated fix to the first problem component to dynamically detect a deviation in a performance of a second problem component among the set of related components as a result of the first automated fix;
    defining a causality relationship between the first and second problem components; and
    defining, based on the causality relationship, an automated fix sequence that includes the second problem component.

2. The method of claim 1, further comprising:
    storing the automated fix sequence in a knowledge base; and
    processing a second problem ticket based on the automated fix sequence stored in the knowledge base.

3. The method of claim 1, further comprising generating a components map of the systems environment that is generated beginning with the problem component and extending to the set of related components that meet the threshold degree of relatedness from a plurality of components in the systems environment.

4. The method of claim 3, further comprising:
    assigning a weighted value to each component in the components map based on its relationship with the first problem component; and
    defining the set of related components based on the weighted value of each component in the components map with respect to the threshold degree of relatedness.

5. The method of claim 3, wherein the automated fix sequence includes applying the second automated fix to the second problem component prior to applying the first automated fix to the first problem component.

6. The method of claim 5, further comprising:
    performing, in response to the detecting of the deviation in performance of the second problem component, in which a problem was not previously detected, in response to the first automated fix, an iterative process, including:
        extending the components map beginning with the second problem component that defines relationships of the second problem component with a second set of related components in the systems environment;
        monitoring the second set of related components, excluding components that do not meet a threshold degree of relatedness to the second problem component, while attempting to apply the second automated fix to the second problem component to dynamically detect a deviation in a performance of a third problem component among the set of related components as a result of the first automated fix; and
        including the third problem component in the automated fix sequence by performing the iterative process based on the third problem component, in response to the detecting of the deviation in the performance in the third problem component and
    terminating the iterative process without implementing any changes in response to a number of iterations of the iterative process exceeding a predetermined threshold number of iterations.

7. The method of claim 1, wherein the problem management issue is a non-change related issue.

8. A computer program product embodied in a computer readable storage medium that, when executed by a computer device, performs a method for automatically processing a problem ticket in a systems environment, the method comprising:
    identifying a first problem component in the systems environment that corresponds to the problem ticket, the problem ticket being related to a problem management issue encountered during operation of the systems environment;
    generating a logical relationship between the first problem component and a set of related components in the systems environment, the set of related components including at least one component for which a problem has not currently been detected;
    monitoring the set of related components, excluding components that do not meet a threshold degree of relatedness, while attempting to apply a first automated fix to the first problem component to dynamically detect a deviation in a performance of a second problem component among the set of related components as a result of the first automated fix;
    defining a causality relationship between the first and second problem components; and
    defining, based on the causality relationship, an automated fix sequence that includes the second problem component.

9. The computer program product of claim 8, the method further comprising:
> storing the automated fix sequence in a knowledge base; and
> processing a second problem ticket based on the automated fix sequence stored in the knowledge base.

10. The computer program product of claim 9, the method further comprising:
> assigning a weighted value to each component in the components map based on its relationship with the first problem component; and
> defining the set of related components based on the weighted value of each component in the components map with respect to the threshold degree of relatedness.

11. The computer program product of claim 8, the method further comprising generating a components map of the systems environment that is generated beginning with the problem component and extending to the set of related components that meet the threshold degree of relatedness from a plurality of components in the systems environment.

12. The computer program product of claim 11, wherein the automated fix sequence includes applying the second automated fix to the second problem component prior to applying the first automated fix to the first problem component.

13. The computer program product of claim 12, the method further comprising:
> performing, in response to the detecting of the deviation in performance of the second problem component, in which a problem was not previously detected, in response to the first automated fix, an iterative process, including:
>> extending the components map beginning with the second problem component that defines relationships of the second problem component with a second set of related components in the systems environment;
>> monitoring the second set of related components, excluding components that do not meet a threshold degree of relatedness to the second problem component, while attempting to apply the second automated fix to the second problem component to dynamically detect a deviation in a performance of a third problem component among the set of related components as a result of the first automated fix; and
>> including the third problem component in the automated fix sequence by performing the iterative process based on the third problem component, in response to the detecting of the deviation in the performance in the third problem component and
> terminating the iterative process without implementing any changes in response to a number of iterations of the iterative process exceeding a predetermined threshold number of iterations.

14. The computer program product of claim 8, wherein the problem management issue is a non-change related issue.

15. A system automatically processing a problem ticket in a systems environment, comprising:
> a memory medium comprising instructions;
> a bus coupled to the memory medium; and
>> a processor coupled to the bus that when executing the instructions causes the system to perform a method, comprising:
>>> identifying a first problem component in the systems environment that corresponds to the problem ticket, the problem_ticket being related to a problem management issue encountered during operation of the systems environment;
>>> generating a logical relationship between the first problem component and a set of related components in the systems environment, the set of related components including at least one component for which a problem has not currently been detected;
>>> monitoring the set of related components, excluding components that do not meet a threshold degree of relatedness, while attempting to apply a first automated fix to the first problem component to dynamically detect a deviation in a performance of a second problem component among the set of related components as a result of the first automated fix;
>>> defining a causality relationship between the first and second problem components; and
>>> defining, based on the causality relationship, an automated fix sequence that includes the second problem component.

16. The system of claim 15, the method further comprising:
> storing the automated fix sequence in a knowledge base; and
> processing a second problem ticket based on the automated fix sequence stored in the knowledge base.

17. The system of claim 15, the method further comprising generating a components map of the systems environment that is generated beginning with the problem component and extending to the set of related components that meet the threshold degree of relatedness from a plurality of components in the systems environment.

18. The system of claim 17, the method further comprising:
> assigning a weighted value to each component in the components map based on its relationship with the first problem component; and
> defining the set of related components based on the weighted value of each component in the components map with respect to the threshold degree of relatedness.

19. The system of claim 17, wherein the automated fix sequence includes:
> performing, in response to the detecting of the deviation in performance of the second problem component, in which a problem was not previously detected, in response to the first automated fix, an iterative process, including:
>> extending the components map beginning with the second problem component that defines relationships of the second problem component with a second set of related components in the systems environment;
>> monitoring the second set of related components, excluding components that do not meet a threshold degree of relatedness to the second problem component, while attempting to apply the second automated fix to the second problem component to dynamically detect a deviation in a performance of a third problem component among the set of related components as a result of the first automated fix; and
>> including the third problem component in the automated fix sequence by performing the iterative process based on the third problem component, in response to the detecting of the deviation in the performance in the third problem component and terminating the iterative process without implementing any changes in response to a number of iterations of the iterative process exceeding a predetermined threshold number of iterations.

20. The system of claim 15, wherein the problem management issue is a non-change related issue.

* * * * *